March 13, 1928.  1,662,204
R. T. PARKHURST
PROTECTOR FOR POULTRY FEEDERS
Filed June 28, 1927
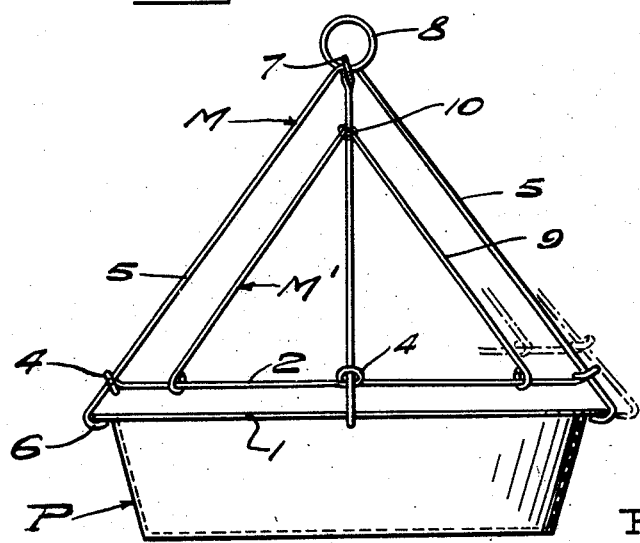
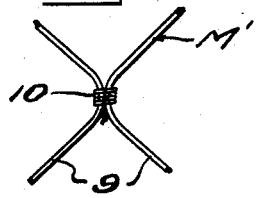
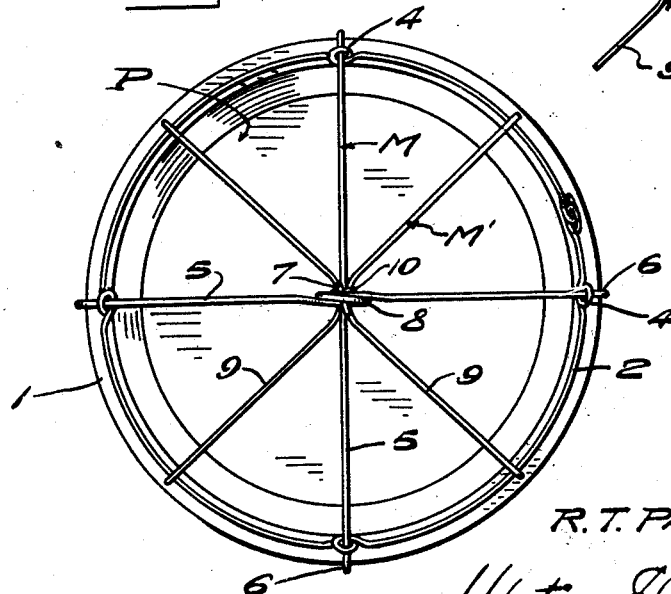
Inventor
R. T. PARKHURST
By Watson E. Coleman.
Attorney Patented Mar. 13, 1928.

1,662,204

UNITED STATES PATENT OFFICE.

RAYMOND T. PARKHURST, OF MOSCOW, IDAHO.

PROTECTOR FOR POULTRY FEEDERS.

Application filed June 28, 1927. Serial No. 202,099.

This invention relates to protectors for poultry feeders and it is an object of the invention to provide a device of this kind which may be readily applied in the required working position and when in such position serves to afford effective means to protect the contents of such feeder being contaminated by fowls stepping or flying therein, and which also provides means to permit the feeder to be suspended when desired.

The invention consists in the details of construction and in the combination and arrangement of the several parts of my improved protector for poultry feeders whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:—

Figure 1 is a view in side elevation of a protector constructed in accordance with an embodiment of my invention;

Figure 2 is a view in top plan of the device as herein disclosed;

Figure 3 is a detailed view illustrating means herein embodied for connecting the apex portions of the inner or lower members.

My improved protector is adapted to be employed in connection with a poultry feeder of a pan type as indicated by P in the accompanying drawings and which is provided with an outstanding marginal flange 1.

My improved protector comprises an annular member 2 formed from a strand of wire of requisite gauge and of a diameter closely approaching the diameter of the pan P. This member 2 at points spaced circumferentially therearound is formed with the upwardly and outwardly inclined eye members 4 through which are freely directed the legs 5 of the members M. Each of these members M is in the form of an inverted V and the outer or free extremities of these legs 5 are provided with the inwardly disposed hook members 6 adapted to engage the flange 1 of the pan P whereby the protector in its entirety is operatively held to the pan.

The apex portion of one of the members M is formed to provide an eye 7 with which interlocks the eye member 8 formed at the apex portion of the second member M. This eye member 8 is adapted to have affixed thereto a suitable member when it is desired to maintain my improved protector and the pan P to which it is applied in a raised or suspended position.

The annular member 2 hereinbefore referred to has secured thereto the outer extremities of the legs 9 of the members M'. These members M' are also substantially in the form of an inverted V and are disposed in convergence one toward the other and have their apex portions suitably connected as at 10. This mounting of the members M' results in what may be termed a conoidal guard extending upwardly from the annular member 1, and as the extremities of the legs 9 of these members are connected in a fixed manner to the member 1 a grid like structure is provided to protect fowls stepping or flying into the pan P. This protection is further assured in view of the fact that the legs 9 of the members M' are positioned at a point substantially midway between the legs 5 of the members M.

It is also to be noted that the members M' are arranged below the portions of the members M above the annular member 1.

From the foregoing description it is thought to be obvious that a protector for poultry feeders constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

1. A protector of the class described comprising an annular member, a set of inwardly and upwardly disposed legs secured to said member, said annular member at points spaced circumferentially thereof being provided with openings, a second set of upwardly converging legs slidably disposed through said openings and connected at their upper extremities, the lower extremities of the legs of the second set being provided with inwardly facing hook members.

2. A protector of the class described comprising an annular member, a set of inwardly and upwardly disposed legs secured to said member, said annular member at points spaced circumferentially thereof being provided with openings, a second set of upwardly converging legs slidably disposed through said openings and connected at their upper extremities, the lower extremities of the legs of the second set being provided with inwardly facing hook members, said last named legs at their upper connected extremities being provided with supporting means.

3. A protector of the class described comprising an annular member, inwardly and upwardly disposed legs secured to said member, said annular member at points spaced circumferentially thereof being provided with openings, upwardly converging legs slidably disposed through said openings and connected at their upper extremities, the lower extremities of the last named legs being provided with inwardly facing hook members, the first named legs being each positioned between adjacent second named legs.

In testimony whereof I hereunto affix my signature.

RAYMOND T. PARKHURST.